July 1, 1924.  1,499,404

W. H. PRIESS

ELECTRICAL CONDENSER

Filed Dec. 5, 1921      3 Sheets-Sheet 1

Inventor:
William H. Priess.

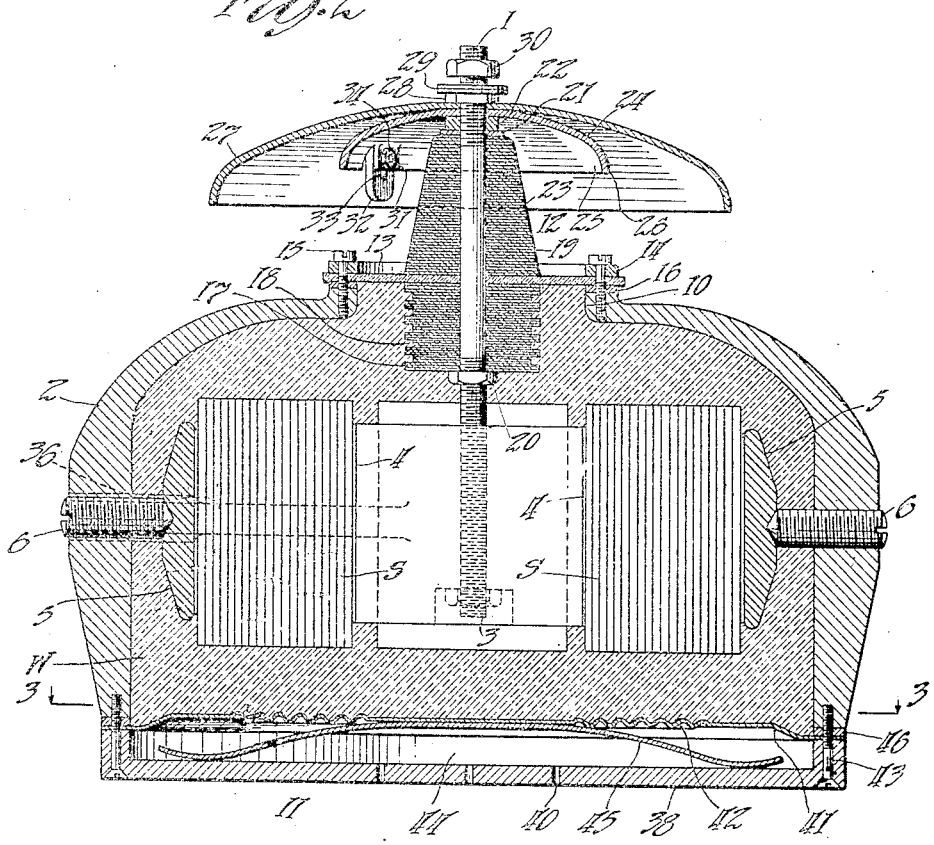

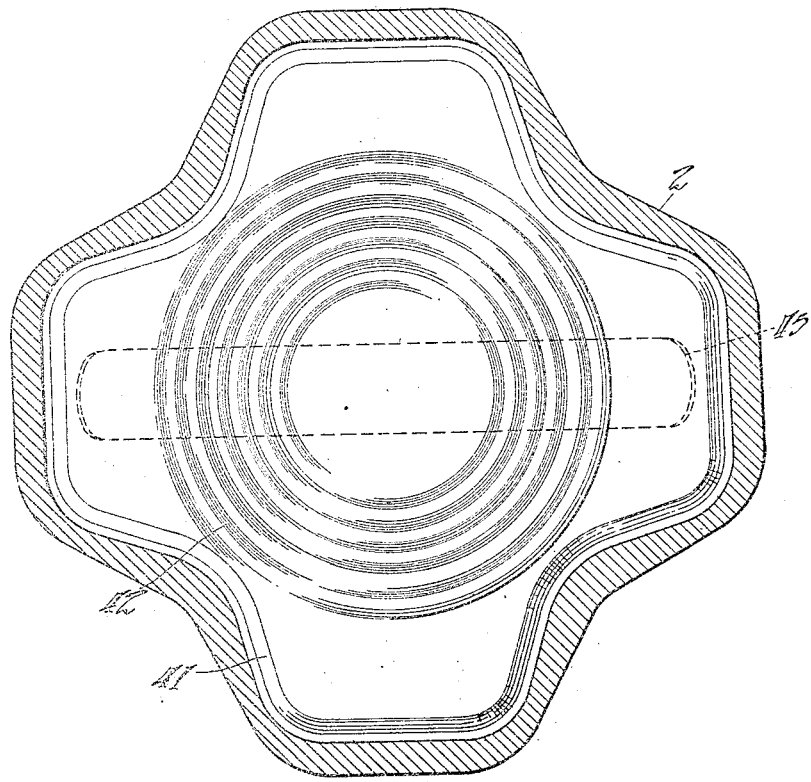

Patented July 1, 1924.

1,499,404

UNITED STATES PATENT OFFICE.

WILLIAM H. PRIESS, OF BELMONT, MASSACHUSETTS, ASSIGNOR TO WIRELESS SPECIALTY APPARATUS COMPANY, OF BOSTON, MASSACHUSETTS, A CORPORATION OF NEW YORK.

ELECTRICAL CONDENSER.

Application filed December 5, 1921. Serial No. 519,889.

*To all whom it may concern:*

Be it known that I, WILLIAM H. PRIESS, a citizen of the United States of America, and a resident of Belmont, State of Massachusetts, have invented certain new and useful Electrical Condensers, the principles of which are set forth in the following specification and accompanying drawings, which disclose the form of the invention which I now consider to be the best of the various forms in which the principles of the invention may be embodied.

This invention relates to electrical condensers.

Condensers embodying the present invention are for use generally, but in particular may be used as an element in dummy antennæ and radio frequency reservoir circuits, as series antenna condensers and also for other radio uses where a large amount of energy is handled in a radio frequency circuit of low resistance.

As an example of a practical and commercial embodiment of such a condenser, it may be made in a standard size of .002 mfd., capable of withstanding an effective voltage of 15,000, and a current of nine amperes at 3,000 meters maximum, altho it is to be understood that the general principles of this invention are applicable to condensers of other sizes and electrical characteristics.

The types of condensers as embodied in the present invention are known as mica condensers, inasmuch as they usually comprise stacks composed of alternate sheets of foil and dielectric, the foil consisting preferably of a soft material such as lead or tin, and the dielectric consisting preferably of mica, which is one of the best dielectrics known for this purpose. The stacks are constructed in sections connected in series with separators between the sections in a well-known manner, and are clamped and secured within suitable casings, the casing preferably in service constituting one of the terminals of the condenser and the other terminal projecting thru the casing and insulated therefrom.

It has been found that the hysteresis losses in a mica condenser in general increase very rapidly with increased temperature of the mica which results in operating the condenser with the mica at an undesirable point of its phase angle temperature curve. A stack of a mica condenser comprising the alternate sheets of foil and dielectric and in a wax filler, or which has been treated with some suitable wax such as paraffin and embedded in such paraffin, has very low thermal conductivity and therefore under load the heat generated is not properly conducted from the stack, which results in high temperature rise of the stack. This is further accelerated by the hysteresis losses in mica, producing heat, which still further increases the temperature, (the process being cumulative,) and limits the load that the condenser might carry continuously to a comparatively low value. The thermal path thru a condenser of this type depends on the area of the mica sheets and on the length of the stack; that is, the length in a direction at right angles to the plane of the sheets.

An object of the present invention is to provide a condenser in which the heat conduction and radiation from the stack or stacks is at a maximum, whereby the stacks are maintained at a minimum temperature for a given load, which results in the desirable operation and efficiency of the condenser, and a comparatively small volume of mica for a given load when compared with existing designs.

Another object of the invention is to provide a construction which permits maximum loading of the condenser without unduly heating the same.

Another object of the invention is to provide means for allowing the expansion of the insulating filler or embedment in a condenser.

In general, the objects above enumerated are obtained by utilizing in a condenser of any given electrical characteristics a plurality of stacks of optimum length for heat conduction instead of a single stack of a length required to produce a condenser to withstand a given voltage and for a given capacity.

The stack should have minimum length for obtaining the maximum heat conduction and radiation therefrom. This length, however, in a series section condenser having ends at a difference of potential should be such that the creepage path between the ends of the stack is at a safe minimum length. In other words, in this design the minimum stack length that can safely be used for creepage for the voltages employed is incorporated in the design. The stack has a maximum thermal conductivity to the casing and to the high potential terminal.

In the accompanying drawings, I have illustrated one embodiment of the invention, in which Figure 1 is a sectional plan view of the condenser;

Fig. 2 is a sectional elevation thereof; and

Fig. 3 is a sectional plan view thereof on line 3—3 of Fig. 2, looking in the direction of the arrows.

Figure 1:
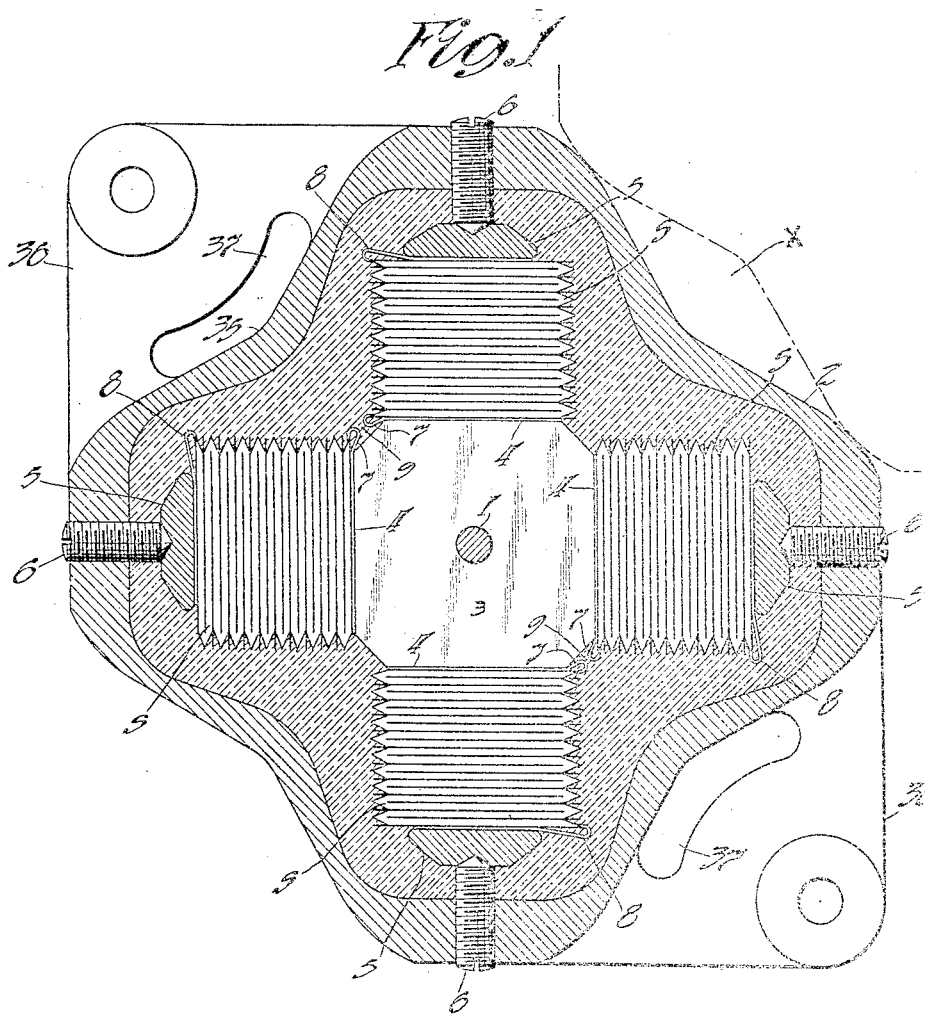

In the design of condensers for a given voltage and capacity, it is necessary to have the mica and foil sheets of such size that when the sections composing the stacks are connected in series or series parallel, such stacks will have the correct capacity and be capable of withstanding a given voltage. In the present embodiment of the invention, the condenser comprises a plurality of stacks S, for instance four in number as illustrated. The several stacks are connected in parallel to a central terminal 1 and the casing 2, which is preferably of metal. Each stack S consists of a plurality of sections connected in series with separators inserted between the sections and projecting beyond the connections in the usual manner. These stacks in turn are connected in parallel, the outer ends of the stack being electrically connected to the casing 2, and the inner ends of the stack being electrically connected to a metal block or pressure member 3, having high thermal conductivity compared with the total conductivity of the stacks in contact therewith. The metal block 3 is preferably of some light metal such as aluminum, and in the present embodiment is a cube having flat surfaces engaging the inner ends of the stacks S as indicated at 4. Each stack is secured in position and clamped within the casing 2 against one face of the block 3 by means of a metal pressure plate 5 engaging the outer end of the stack, and with which a screw 6 threaded thru the casing engages. It will thus be seen that each stack S is compressed between the block 3 and one of the pressure plates 5. The block 3 covers substantially the entire surface of the inner end of each stack, while each pressure member 5 does the same at the opposite end of each stack S and preferably consists of a good conducting metal which is electrically and conductively connected to the casing. The stacks S as here disclosed are arranged horizontally within the casing; that is, the individual sheets composing the stack are at right angles to the base. The free terminal of the innermost section of each stack has soldered to it a flexible copper lead 7 (Fig. 1) which is bent back around the end of the stack and interposed between the stack and the block 3, while the free terminal of the outermost section of each stack is in like manner provided with a copper lead 8 which is bent back and clamped between the pressure plate 5 and the stack, whereby the inner ends of all the stacks are electrically and conductively connected to the block 3, while the outer ends of the stacks are electrically and conductively connected to the casing 2.

In positioning the several stacks S in the condenser casing and clamping them in position, the free terminals of the innermost sections of adjacent stacks should be positioned adjacent to each other as indicated at 9, these points being at the same potential and not requiring any insulation between them. Threaded thru the block 3 and secured in place by a nut located in a recess in the lower end of the block 3 (Fig. 2) is the terminal 1 which projects outwardly thru an opening 10 at the top of the casing at the side thereof remote from a closure or bottom 11. This terminal 1 has high thermal conductivity for properly conducting the heat transmitted from the stacks S to the central member 3. In this invention, there is provided a plurality of relatively short stacks having good thermal contact with members of high thermal conductivity at opposite ends, which members have adequate radiating surfaces exposed to the air.

Inasmuch as the high potential terminal 1 must be thoroly insulated from the casing 2, which is the low potential terminal, I utilize an insulating device 12. In the present embodiment, this insulating device comprises a disc or plate 13, of insulating material, which is of an area greater than the area of the opening 10 within the casing and extending over the boundaries of said opening. This disc is preferably of some material having high insulating qualities and low loss such as mica, and should be so designed as to withstand the difference in potential between the casing 2 and terminal 1. It is preferred that this plate 13 consist of mica, which is one of the best materials for this purpose,—this plate 13 being clamped inwardly of its edge to the casing 2 by means of a metal ring 14 and screws 15 passing thru the ring 14 into the casing 2, a suitable lead or other gasket 16 being interposed between the mica sheet and the casing 2 to secure a tight joint. The member 1 extends thru the disc 13. Mounted around member 1 below the plate 13 is an insulating bushing 17 of reduced diameter compared to plate 13 and engaging the bottom of disc 13 and surrounding terminal 1. This bushing is provided with one or more corrugations or grooves 18 arranged circumferentially therearound to increase the creepage distance between the terminal 1 and casing 2, and consists preferably of a laminated structure; for instance, a plurality of mica pieces or discs of diameter reduced compared with the disc 13 and compressed together in the manner hereinafter described. Upon the opposite side of the large mica plate 13 is an insulating bushing 19 of reduced diameter compared with disc 13 mounted thereon and surrounding and insulating the upper portions of the member 1. Like the bushing 17, the bushing 19 is also of laminated insulating material preferably built up of superimposed pieces or discs of mica and of decreasing diameter upwardly as illustrated, forming an upwardly tapering bushing.

The device 12 is preferably constructed or assembled on member 1 by assembling thereon the mica discs, plates or washers in their proper order. In the embodiment herein illustrated, nut 20 is threaded on member 1. The mica washers or pieces constituting the bushing 17 are then positioned or assembled on member 1 upon nut 20, then disc 13 is positioned, and then the pieces constituting the bushing 19 are positioned on member 1. A washer 21 and round nut 22 are then threaded upon the upper end of member 1 to hold the mica sheets and pieces in position against dislocation. The assembly is then treated in a bath of hot molten insulating material, which will act more or less as an adhesive, for about fifteen minutes until bubbles cease, either with or without the application of vacuum. Suitable materials for this purpose are insulating varnishes, such as paraffin or fusible insulation such as sulfur. The assembly while hot and impregnated with molten insulating material is compressed or clamped tightly by nut 22 and allowed to cool, thus clamping the mica sheets together in a solid mass held together by nut 22 (which may be pinned to member 1) and by the fusible insulation which has now solidified. The bushing 19 is then cut, turned or ground to proper shape and polished, providing a smooth tapered surface 23. The bushings 17 and 19 are thus retained and supported on plate 13 and held under compression entirely by means of member 1 and nuts 20 and 22. The grooves 18 are formed by assembling intermediate mica washers of reduced diameter.

Above nut 22, in close electrical contact therewith and member 1, is a concavo-convex metal member 24, having its concave side 25 facing the bushing 19 and having its edge 26 in vertical alinement with and spaced from the clamping ring 14. The inclination of the surface 23 of the bushing 19 and the curvature and spacing of the member 24 are so arranged with reference to each other and so proportioned that any difference of potential between the opposite ends of the member 1 produces electrical stresses not thru the insulator 19 but mainly thru the air from member 24 to the casing 2, maintaining the electrical field parallel with the bushing 19 instead of cutting the same. In other words, member 24 with casing 2 provides a static shield preventing losses in the insulator 19 and the destruction thereof. The member 24 also performs additional functions in that it provides a large-surfaced terminal for radiating heat generated in the stack and conducted thru the terminal 1 to member 24. The member 24 also serves as a protector or dust-guard for the insulating device 12, preventing deterioration thereof; that is, it is located above the insulating disc 13 and the bushing 19. Mounted on terminal 1 above the concavo-convex member 24 is a large-areaed radiating bell-shaped brass member 27 extending out beyond the member 24 and enclosing the same and adapted to efficiently radiate the heat conducted from the stacks by terminal 1. The corona member 24 and radiating member 27 are secured in place by means of a nut 28 threaded upon the upper portion of the member 1, and above this are located washer 29 and nut 30 whereby any suitable lead may be attached to the high potential terminal in the usual manner.

I have also provided a spark-gap for association with the condenser to prevent the formation of excessive differences of potential between the high and low potential portions thereof. For this purpose, the metal member 24 is struck down, forming a vertical part 31, on which is mounted a round-ended spark-pin 32 having a longitudinal slot 33 therein and secured to part 31 by means of a screw and nut 34 extending thru slot 33, whereby the spark-pin 32 may be adjusted vertically relative to the clamping ring 14 to increase or decrease the distance between them, the pin 32 being in vertical alinement with such ring and forming therewith a spark-gap.

By means of the four adjusting screws 6, the central pressure member 3 may be adjusted back and forth within the casing along lines at right angles to each other to properly position terminal 1 within the casing and with reference to the opening 10, the stacks S being arranged 90° apart around the terminal 1 as a center and engaging the vertical faces of block 3, two stacks being arranged on each line, engaging opposite faces of block 3 and adjustable back and forth with member 3 by means of their screws 6. This adjustment may be secured when the stacks S are assembled within the condenser casing 2, and upon final pressure applied by the screws 6 the several stacks are highly compressed against the central block 3 with terminal 1 properly centered.

Adjacent stacks S are arranged at right angles to each other forming an angle between each pair which the sections connections face, four such angles being formed in the present construction. The inner ends of the stacks are at the same potential, being electrically connected to block 3, and the outer ends of the stacks are at the potential of the casing, being electrically connected thereto. Hence the casing may be very close to the outer ends of the stacks, but must be increasingly spaced from the stacks towards their inner ends as the potential increases from the outer end to the inner end of each stack. By reason of the angles formed between adjacent stacks, the casing is reduced in diameter or in cross section at these points along lines bisecting the angles, and projects into these angles as indicated at 35, the inner walls of the casing, however, being increasingly spaced from each stack towards its inner end on account of the increased potential difference between the casing and inner portions of the stack. By the above construction, is provided a casing having minimum volume and weight and a condenser having a resulting minimum of filler and a maximum thermal conductivity between the stack and casing via the filler path but in which all parts at a difference of potential are sufficiently spaced for insulating purposes and in accordance with the potential gradient. By reason of the arrangement of stacks herein described and reduction of the size of the casing in accordance with the potential gradient, the casing having minimum clearance at all points, the casing in cross section is a more or less cross-shaped or what may be called a clover leaf shape.

Arranged at diagonally opposite points on the outside of the casing 2 centrally thereof are projecting integral metal horizontal flanges 36 constituting securing lugs for mounting the condenser in or on any suitable rack. These flanges adjacent the vertical portions of the casing are provided with openings 37 to allow air-circulation for cooling purposes. The reduced portions 35 of the casing 2 also perform an additional function, inasmuch as when two condensers are assembled in contact as indicated in broken lines (Fig. 1), there is provided between the condensers a vertical passageway X to allow circulation of air between the condensers for cooling them.

After the parts have been assembled as above described and as shown in the drawings, the stacks and the high potential terminal are embedded or surrounded with insulating material W, such as paraffin or oil. This embedment is preferably secured within the condenser thru the bottom, the latter comprising a removable closure 11 of special construction for a purpose hereinafter described. This closure preferably consists of a box-like member 38, having air-passages 40 therethru, and a flexible metal diaphragm 41 having centrally thereon concentric corrugations 42, secured at its edge to member 38 by screws 43, which also secure closure 11 to casing 2 with diaphragm 41 innermost, and forming with member 38 a box having a chamber 44. Located within a chamber 44 and bearing against the diaphragm is a spring 45, which maintains the diaphragm 41 yieldingly in elevated position relative to the bottom of the casing. If, for any reason, during the use of the condenser, the wax or oil embedment W should expand, this expansion reacts against the diaphragm 41, which yields compressing the spring 45 without straining the casing 2 and thus relieving the latter from stress or distortion due to the expansion of the embedment whereby the several stacks S are maintained under constant compression of a high order without variation, change of capacity, or deterioration due to expansion of the casing and subsequent loosening of the clamps of which the casing forms a part.

The stacks S of the present invention may be constructed and assembled in part in the manner described in my copending application Serial No. 456,903, filed March 30, 1921. The process therein described covers the manufacture of a stack by preliminarily dipping the individual sheets of mica in suitable insulating material, such as molten paraffin, and building what is called the material stack consisting of alternate sheets of foil and dielectric, and then treating the material stack thus formed in molten insulating material such as paraffin and applying high compression and cooling, forming a solid block. After this, the material stack is split up into sections, which are connected in series, and the insulating separators inserted between the sections. Of course, the sections may be assembled and connected by any desired method. For instance, each section may be built up under molten wax, heated, compressed and cooled under pressure. Each section is then tested for capacity and voltage. The sections are then connected in series and separators inserted between them. After the sections have been connected by solder and the sectional separators positioned, the two leads 7 and 8 are soldered to the free terminals of the end sections. The stack is then placed on the base of a building stand provided with four vertical rods having vertical notches upon their inner sides adapted to receive the corners of the condenser stack; or, if so desired, a stand having six rods may be used, two rods engaging each side of the stack and one at each end. A stand adaptable for this purpose is disclosed in a pending application of G. W. Pickard, Serial No. 380,919, filed May 12, 1920. The stack when positioned in the stand is supported and braced by the vertical rods against dislocation and side slip. The stack and stand are then placed in a hot molten paraffin bath, or a bath of other insulating material, for approximately twenty minutes until the stack is warm, the bath being at approximately a temperature of 130° C. The stack and stand are then removed from the bath, and the stack while still in the stand and while still hot is placed under a pressure of the order of magnitude of a ton per square inch over the active surface of the stack, and allowed to cool under pressure before being placed in the final condenser structure of casing 2, the vertical rods of the stand supporting and bracing the stack against side slip while under the great pressure. The stack while under the pressure of the order of magnitude above-mentioned and after cooling is tested for capacity, and the capacity finally adjusted to its correct value, if this is necessary. Thus, it will be seen that the final and correct capacity can be obtained before the stack is finally clamped in the casing 2 and embedded, thereby avoiding the removal of the filler after finally embedding for the purpose of obtaining desired capacity, if on test the capacity is found to be wrong. By cooling the stack under pressure outside of the casing in the manner above-described, the stack can also be tested for breakdown before being placed in the casing as well as measured for final length. Furthermore, by thus waxing and cooling the complete condenser stack, including the separators between sections, before being placed in the casing, it can be handled as a block and side slip cannot occur during the filling operation after the stack S is placed within the casing 2 and maintained under pressure by members 5 and 6.

In former processes and methods of building stacks and assembling them within the condenser casing, the wax treating, compression and cooling operations on the completed stack, including the separators in place, as well as the final adjustment of capacity have usually been done in a permanent clamp forming part of the condenser and in the condenser casing. In that process, however, it was difficult to maintain good stacks where the length of the stack exceeded by over twice the largest dimension of the base or where sectional separators had been inserted. Such length of stack by reason of the greater number of sections and the greater number of sectional separators tended to cause the side slip above referred to, upon final compression, that is, where the stack was relatively high or had separators which had not previously been waxed, or both, upon compression, the elements of the stack tended to be displaced relatively to each other. By providing lateral support for the stack during compression, this difficulty is obviated.

After the stacks S, including the separators, have been waxed and compressed, cooled and tested as above described, they are in condition to be handled, being cold and covered with wax and are directly secured within the casing 2 by means of the clamping members 5 and adjusting screws 6 in the manner above described. The terminal gasket 16 is then positioned and terminal 1 threaded into block 3. The insulator 12 around terminal 1, including the disc 13, is then clamped to the casing 1 by means of ring 14 and screws 15. The bells 24 and 27 and remaining nuts are then assembled and spark-pin 32 properly located.

After the parts have been assembled as illustrated in the drawings, with stacks S held by members 5 and 6 under sufficient pressure to hold them in place, the whole condenser can be inverted, the bottom 11 being removed, and the same embedded in the manner described in my application 456,903 above-mentioned to provide a compact, non-porous, holosteric embedment W for the stack and around bushing 17 and terminal 1 within the casing 2, which is free from air and voids. As described in such application 456,903, a head or extension is secured to the casing, and the casing and extension are preliminarily heated by filling the same with molten paraffin at a temperature around 140° C. While thus filled, the final pressure is applied to stacks S by tightening up screws 6. The molten paraffin is then removed and vacuum applied and the casing and extension filled with molten paraffin or other insulating filler which is allowed to solidify from the bottom upwardly in the manner described in said application 456,903. In some cases, the preliminary heating with paraffin may be omitted and the stacks S finally clamped under high pressure as soon as positioned. The condenser stacks and terminal 1 are then embedded in the manner above described and the head and surplus wax or insulating material removed as described in said application 456,903. After the embedment, the bottom 11, with its intervening gasket 46, is secured in place by means of the screws 43. The diaphragm 41 being flexible, allows the expansion of the wax, if required.

The insulator 12, for the purpose of insulating the high potential terminal from the casing, provides a long creepage path with short height. Additional creepage is obtained by providing circumferential grooves in either or both of the mica bushings upon either or both sides of the mica disc 13. I have shown such grooves 18 in the mica bushing 17 below the disc 13. In the present construction, the insulator 12 comprises a single mica disc 13 clamped to the casing 2, and built-up discs of mica of reduced diameter forming bushings upon and supported by the disc 13, the bushings being clamped to the disc 13 at opposite sides thereof by means of the member 1 and cooperating nuts threaded thereon.

By the present invention, instead of using one stack, I have used four stacks, each stack having a minimum length consistent with the creepage between the opposite ends of the stack due to voltage differences. Each stack has maximum thermal conductivity to the casing and to the high potential terminal. The high potential terminal is provided on the exterior of the condenser with a corona spark-gap shield and a large heat-radiating member, the casing 2 constituting the other large heat-radiating member. It will thus be seen that each stack, of minimum length, engages at opposite ends conductors having a high thermal conductivity and large heat-radiating powers. The construction and method of building the stack is such that side slip is prevented. The pressure applied to the opposite ends of each stack should be of the order of thousands of pounds per square inch, and of an order which is slightly below a value that will cause spreading of the foil. The structure above-described is such that the stacks are maintained at a minimum temperature for a given load, which results in efficient operation and low loss. In this invention, by placing four short stacks, which are electrically in parallel with one another and each consisting of series sections, thermally parallel between high-conducting terminals, the thermal path is improved in a ratio of approximately sixteen to one over a single stack having the same electrical characteristics and built with the same size of mica. In this arrangement, I have improved the condenser construction by increasing the thermal conductivity and radiation of the structure so that it will carry several times the energy of the equivalent single stack with the same heating. In the present invention, for the same capacity, I have been able to reduce the amount of mica required in a condenser, thus materially reducing the cost. For instance, in a condenser having a single stack of the same length as the total length of the four stacks of the present condenser and having the capacity of the condenser of the present invention, there would be required mica sheets of four times the area over those required for the condenser of this invention. Furthermore, a much more expensive clamping means would be required to obtain the same pressure per unit area, this clamping means moreover would be inferior and inefficient as well as bulky. In the present invention, by the methods of manufacturing the stack as above-described and by reason of the minimum length of the stack, side slip has been reduced to a minimum, and the clamping features simplified while maintaining the high pressure.

It will be seen, therefore, that the present invention provides a very efficient high tension condenser which is very compact, in which the stacks are maintained under the highest practicable compression to maintain the sheets of foil and dielectric in intimate contact to prevent losses in the stack and increase its thermal conductivity, at the same time the casing being so constructed as to have a high heat-radiation from the outer ends of the stacks and which is sufficiently spaced for insulating purposes from points along the several stacks at a difference of potential without unduly increasing the size of the casing. The inner ends of the stacks, in like manner, have high thermal conductivity to the outside thru block 3 and terminal 1, where the heat is radiated by the large heat-radiating members upon the terminal 1. Altho the whole condenser is embedded in wax, the pressure is maintained constant on the stacks irrespective of the expansion of the wax embedment, by reason of the flexible diafragm and spring box supplied to allow expansion, taking the strain off of the clamping portion of the casing.

Inasmuch as in quantity production it is advisable to have the blocks 3 and casings of uniform standard size, in cases where the stacks S are too short to be properly clamped between such casings and blocks, additional metal blocks (not illustrated) may be inserted between the inner ends of the stacks and blocks 3 to secure the required pressure and clamping, these additional blocks forming with blocks 3 a highly thermal conductive path to terminal 1 and constituting with blocks 3 the central pressure member.

It is to be understood that the invention is not limited to the embodiments and features specifically shown and described herein, but that such embodiments and features are subject to changes and modifications without any departure from the spirit of the invention.

The word "plurality" is used herein to define two or more stacks, as the case may be.

I claim:

1. An electrical condenser comprising a plurality of stacks of sheets each of which stacks is short for heat conduction as compared with a single stack electrically equivalent to the plural stacks; a common enclosure for said plural stacks; two heat-radiating members outside said enclosure; a heat-conducting condenser-connection from one set of electrical ends of said plurality of stacks to one of said heat-radiating members; the other set of electrical ends of said plural stacks being thermally and electrically connected to the other of said heat-radiating members, whereby said plural stacks are connected in parallel between the two radiators.

2. An electrical condenser comprising a plurality of stacks of sheets each of which stacks is short for heat conduction as compared with a single stack electrically equivalent to the plurality of stacks; a common metal casing for all said short stacks and with which as a heat-radiator and condenser terminal one set of electrical ends of said plural stacks is in good thermal and electrical connection; heat-radiating and terminal means mounted externally on and electrical insulated from said metal casing; and thermal and electrical conducting means extending between the other set of electrical ends of said short plural stacks and said external radiating means, and electrically insulated from said casing.

3. In an electrical condenser, a casing, a plurality of stacks arranged within the casing, a common metallic pressure member engaging the inner ends of the stacks, adjusting means mounted on the casing and engaging the outer ends of the stacks whereby said pressure member may be adjusted along lines at an angle to each other, and a terminal connected to said pressure member and projecting thru the casing.

4. An electrical condenser comprising a plurality of stacks of sheets, each stack being short for heat-conducting as compared with a single stack electrically equivalent to said plural stacks; a metal casing for said plural stacks and constituting one terminal of the condenser; a second condenser terminal projecting out through and insulated from said metal casing; each of said stacks consisting of a plurality of serially-connected sections and said plural stacks being connected in parallel between said two condenser terminals; a central metal block against which abut one set of ends of said plural stacks which radiate outwardly from said block toward the walls of said casing; said block being thermally and electrically connected to said projecting condenser terminal; and thermal and electrical connecting means between the outer ends of the stacks and said metal casing, said connecting means comprising devices which clamp each stack of serially-connected sections against said central metal block.

5. An electrical condenser comprising a central metal block; a plurality of stacks of sheets, each stack being short as compared to a single stack electrically equivalent to the plural stacks; said stacks extending outward radially from said central metal block; a metal casing enclosing said stacks and electrically and thermally connected to the outer ends of the stacks, and constituting a condenser terminal and heat-radiator; a terminal lead extending from said central metal block out through and insulated from said metal casing and constituted to conduct heat from said block; and a heat-radiator mounted on said terminal lead outside the metal casing.

6. In an electrical condenser, a casing, a plurality of stacks within the casing, a centrally-located pressure member with which the inner ends of the stacks engage, pressure members engaging the outer ends of the stacks, means threaded in said casing and engaging said last-mentioned pressure members for compressing the stacks against the central member, the outer ends of said stacks being electrically connected to the casing and the inner ends electrically connected to the pressure member, and a rigid terminal secured to said pressure member and extending thru the casing to the outside thereof, and means insulating said terminal from said casing.

7. In an electrical condenser, a plurality of stacks arranged at an angle to each other, a metal member engaging adjacent ends of the stacks, said stacks comprising a plurality of sections connected in series, and means electrically connecting the inner ends of said stacks to said member, said connections being made at adjacent sides of the stack within said angle.

8. In an electrical condenser, a metal casing, a block of metal therein having a high thermo-conductivity and arranged centrally thereof and provided with four vertical surfaces, four stacks arranged horizontally within said casing and having their inner ends engaging said surfaces, said stacks being arranged along lines at right angles to each other, threaded members engaging the casing and outer ends of the stacks for compressing the same against the central member, the inner ends of said stacks being electrically connected to the central member and the outer ends of the stacks being electrically connected to the casing, and a terminal connected to said central member, having a high thermal conductivity, extending outside of the casing and insulated therefrom.

9. In an electrical condenser, a metal casing, a block arranged centrally within said casing and having vertical sides, condenser stacks arranged horizontally within the casing and each engaging one of the sides, said stacks each comprising sections connected in series, the inner ends of the stacks being electrically connected to said central block and the outer ends of the stacks being electrically connected to the casing, adjacent stacks being arranged angularly with relation to each other with increased separation between them from points inwardly outwardly, said casing having reduced portions extending into the angles between the stacks and shaped to provide increased separation between the casing and adjacent portions of the stacks in accordance with the potential difference between them when in operation, and a terminal connected to said block and projecting through the casing and insulated therefrom.

10. An electrical condenser comprising a central metal block; a plurality of stacks of sheets each of which stacks is short for heat conduction as compared with a single stack electrically equivalent to said plural stacks, one set of ends of said short stacks abutting against said central metal block, and said short stacks radiating outwardly from said central metal block; two condenser terminals having large heat-radiating surfaces; one of said condenser terminals being in good electrical connection with the inner ends of the several short stacks and in good thermal and electrical connection with said central metal block; and the other condenser terminal being in good electrical and thermal connection with the outer ends of the several short stacks, whereby the latter are connected in parallel between the two condenser terminals.

11. An electrical condenser comprising a plurality of stacks of sheets, each stack being short for heat-conduction as compared with a single stack electrically equivalent to the plural stacks; a common metal casing for said plural stacks, said casing being in good electrical and heat-conducting relation with one set of electrical ends of said plural stacks, and constituting one terminal of the condenser; and a heat-conducting condenser connection in good electrical and heat-conducting relation with the other set of electrical ends of said plurality of stacks, and extending out through and insulated from said metal casing and constituting another terminal of the condenser.

12. In an electrical condenser, a casing, condenser elements within the casing, a filler of insulating material within the casing, and means for allowing the expansion of said insulating material comprising a box-like member having a flexible wall facing the insulating material.

13. In an electrical condenser, a casing, condenser elements within the casing, insulating material filling said casing and surrounding said condenser elements, means for allowing the expansion and contraction of said insulating material comprising a flexible diaphragm facing the insulating material and enclosing a chamber and a spring mounted in said chamber and engaging said diaphragm whereby it is resiliently supported.

14. In an electrical condenser, a casing, a condenser stack mounted within the casing, said casing comprising a part of the clamping means for the stack, insulating material filling said casing and surrounding the stack, and means for allowing the expansion and contraction of said insulating material without affecting the clamping on the stack, said means comprising a flexible diaphragm facing the insulating material.

15. An electrical condenser comprising a plurality of stacks of sheets, each stack being short as compared with a single stack electrically equivalent to the plural stacks; members of high thermal conductivity in good thermal contact with opposite ends of said plural stacks; a common enclosure for said plural stacks and heat-conducting members; and radiating members external to said enclosure and thermally connected with the thermal conducting members.

16. In an electrical condenser, a casing, condenser elements within the casing, a filler of insulating material within the casing and means for allowing the expansion of said insulating material comprising a box-like member attached to the casing and having an inner flexible diaphragm facing the filler and a spring in the box-like member bearing against said diaphragm.

17. In an electrical condenser, a casing, condenser elements within the casing, a filler of insulating material within the casing, said filler being placed therein through an opening in the casing, and a closure for said opening comprising a flexible diaphragm facing the filler to allow the expansion thereof.

18. In an electrical condenser, a metal casing, a stack mounted within said casing and having one end in high thermo-conductive and electrical relation to the casing, a high potential terminal having a highly thermal-conductive engagement with the opposite end of the stack, insulated from the casing and projecting therethru, and a large heat-radiating member mounted upon said terminal outside of the casing.

19. In an electrical condenser, a metal casing, a stack therein, means for clamping the stack within the casing, one end of said stack being electrically connected to the casing, a high potential terminal connected to the opposite end of the stack and projecting thru said casing, an insulating bushing insulating said high potential terminal from the casing, a static shield mounted upon said terminal above said bushing and extending therearound to prevent losses therein, and a heat-radiating member of larger area than said shield and mounted on said terminal above the shield.

20. In an electrical condenser, a metal casing, four stacks arranged within said casing and connected in parallel, said stacks each comprising sections connected in series, each stack being relatively short compared to a single stack electrically equivalent to all of said stacks, a central block mounted within said casing with which the inner ends of the stacks engage and to which the stacks are electrically connected, said blocks having relatively high thermo-conductivity compared to the stacks, pressure members adjustably mounted on the casing and engaging the outer ends of the stacks whereby the latter are clamped against the central member, and the central member may be adjusted in directions at right angles to each other, said outer ends of the stacks having a high thermo-conductive relation to the casing and being electrically connected thereto, a high potential terminal secured to the central member and projecting thru the casing, a bushing insulating said terminal from the casing, said terminal having high thermo-conductivity compared to the stacks, a static shield mounted on said terminal above said bushing to prevent losses therein, a large-areaed heat-radiating member mounted upon said terminal above said shield, and a filler of insulating material within said casing surrounding said stack and the lower end of said terminal.

21. In an electrical condenser, a metal casing, a central metal block mounted within the casing and having a terminal projecting thru the casing and insulated therefrom, four stacks mounted within the casing and engaging said central block, adjacent stacks being arranged at an angle to each other, pressure members mounted on the casing and adjustably engaging said stacks for compressing the same against the central member, the outer ends of said stacks being electrically connected to the casing to constitute a terminal thereof, the inner ends of the stacks being electrically connected to said block, said casing having reduced diameters intermediate the clamping means and between adjacent stacks and being spaced from the adjacent sides of the stacks in accordance with the potential differences between them.

22. In an electrical condenser, a metal casing, a plurality of stacks horizontally mounted in said casing, a central pressure member with which the inner ends of the stacks engage and to which they are electrically connected, means engaging the outer ends of the stacks for compressing them against the central member and adjusting the latter back and forth, the outer ends of the stacks being electrically connected to the casing, a rigid terminal threaded in said central member and projecting outside of the casing, means including a bushing for insulating said terminal from the casing and a metal member constituting a static shield for said bushing and for radiating heat and mounted on said terminal around said bushing.

23. In an electrical condenser, a metal casing, a plurality of stacks arranged horizontally within the casing, a common pressure member having high thermal conductivity compared to the thermal conductivity of the stacks and with which the stacks engage at their inner ends, pressure plates engaging the outer ends of the stacks, screws threaded in the casing and engaging the pressure plates for compressing the stacks against the common pressure member, said stacks being electrically connected to the casing and central pressure member, a thermally conductive terminal electrically connected to said central member and projecting thru said casing and insulated therefrom and having outside of the casing a large heat-radiating surface and a filler of insulating material within the casing.

24. In an electrical condenser, a metal casing, a plurality of stacks having a fall of potential therealong and arranged in spaced-apart relation within the casing with their outer ends adjacent to and electrically connected to the casing, said casing having a reduced cross section between the stacks and extending between the same and spaced therefrom in accordance with the potential difference between the stacks and casing, and terminal means insulated from the casing for the inner ends of the stacks.

WILLIAM H. PRIESS.